Figure 1:
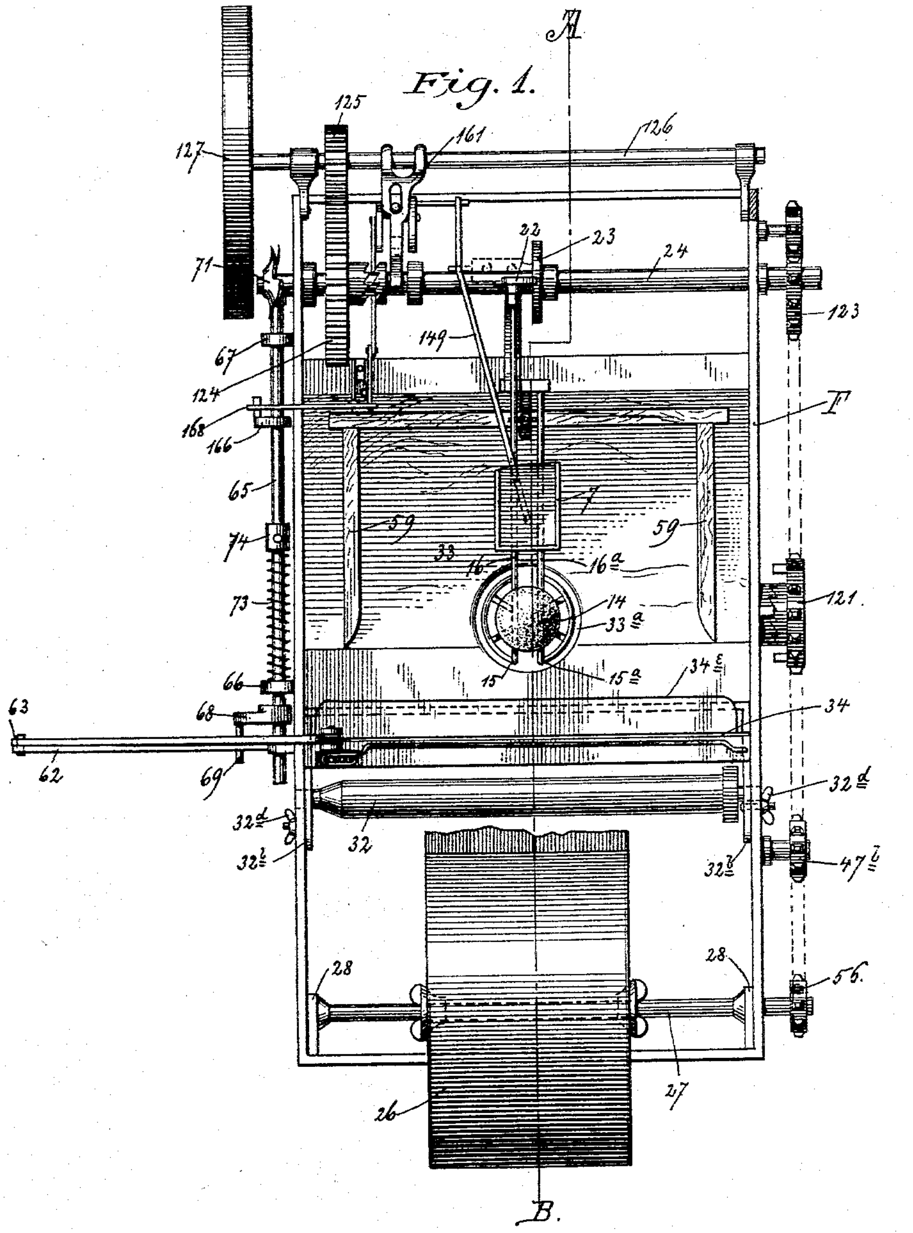

(No Model.)

10 Sheets—Sheet 1.

H. J. WILLIAMS.

ORANGE WRAPPING MACHINE.

No. 533,516.

Patented Feb. 5, 1895.

Witnesses

Chas. H. Baker.

D. W. Edelin.

Inventor:

Humphrey J. Williams.

by Risley, Robinson & Love

Attorneys.

THE NORRIS PETERS CO., PHOTO-LITHO., WASHINGTON, D. C.

(No Model.) 10 Sheets—Sheet 2.

H. J. WILLIAMS.

ORANGE WRAPPING MACHINE.

No. 533,516. Patented Feb. 5, 1895.

Witnesses.

Chas. H. Baker,

D.W. Edelin

Inventor.

Humphrey J. Williams.

by Risley, Robinson & Love

Attorneys.

THE NORRIS PETERS CO., PHOTO-LITHO., WASHINGTON, D. C.

(No Model.)

10 Sheets—Sheet 3.

H. J. WILLIAMS.

ORANGE WRAPPING MACHINE.

No. 533,516. Patented Feb. 5, 1895.

Witnesses.
Chas. H. Baker.
D. W. Edelin

Inventor
Humphrey J. Williams.
by Risley, Robinson & Love
Attorneys

THE NORRIS PETERS CO., PHOTO-LITHO., WASHINGTON, D. C.

(No Model.) 10 Sheets—Sheet 4.

H. J. WILLIAMS.

ORANGE WRAPPING MACHINE.

No. 533,516. Patented Feb. 5, 1895.

Witnesses.
Chas. H Baker
D.W. Edelin

Inventor.
Humphrey J. Williams.
by Risley, Robinson & Love
Attorneys.

THE NORRIS PETERS CO., PHOTO-LITHO., WASHINGTON D. C.

(No Model.) 10 Sheets—Sheet 5.

H. J. WILLIAMS.

ORANGE WRAPPING MACHINE.

No. 533,516. Patented Feb. 5, 1895.

WITNESSES:

Pierrepont Bartow.

Edwin H. Risley

INVENTOR.

H. J. Williams

BY

Risley Lewis & Love

ATTORNEYS.

THE NORRIS PETERS CO., PHOTO-LITHO., WASHINGTON, D. C.

(No Model.) 10 Sheets—Sheet 6.
H. J. WILLIAMS.
ORANGE WRAPPING MACHINE.
No. 533,516. Patented Feb. 5, 1895.
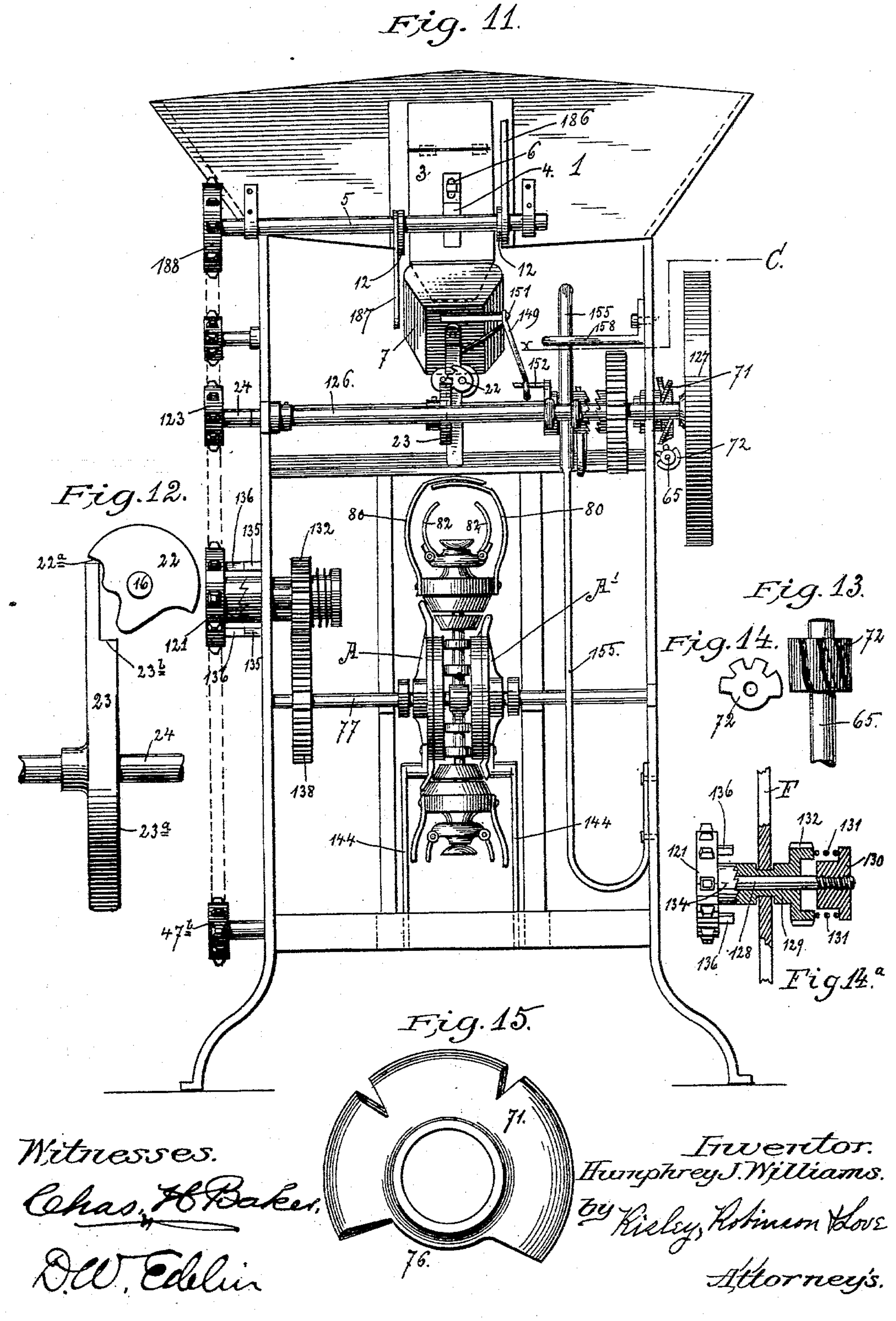
Fig. 11. Fig. 12. Fig. 13. Fig. 14. Fig. 14.a Fig. 15.
Witnesses.
Chas. H. Baker.
D. W. Edelin
Inventor.
Humphrey J. Williams.
by Kisley, Robinson & Love
Attorneys.
THE NORRIS PETERS CO., PHOTO-LITHO., WASHINGTON, D. C.

(No Model.) 10 Sheets—Sheet 7.

H. J. WILLIAMS.

ORANGE WRAPPING MACHINE.

No. 533,516. Patented Feb. 5, 1895.

Witnesses.
Chas. H. Baker,
D.W. Edelin

Inventor:
Humphrey J. Williams.
By Risley, Robinson & Love
Attorneys.

THE NORRIS PETERS CO., PHOTO-LITHO., WASHINGTON, D. C.

(No Model.) 10 Sheets—Sheet 8.
H. J. WILLIAMS.
ORANGE WRAPPING MACHINE.
No. 533,516. Patented Feb. 5, 1895.
Fig. 20.
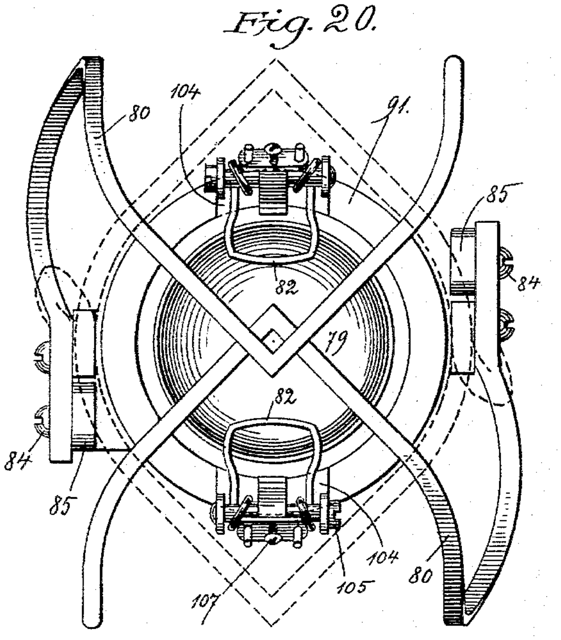
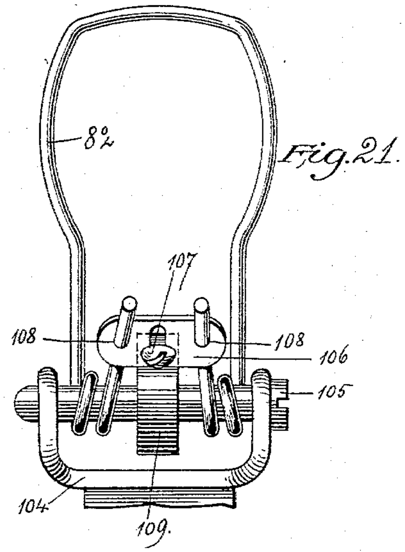
Fig. 21.
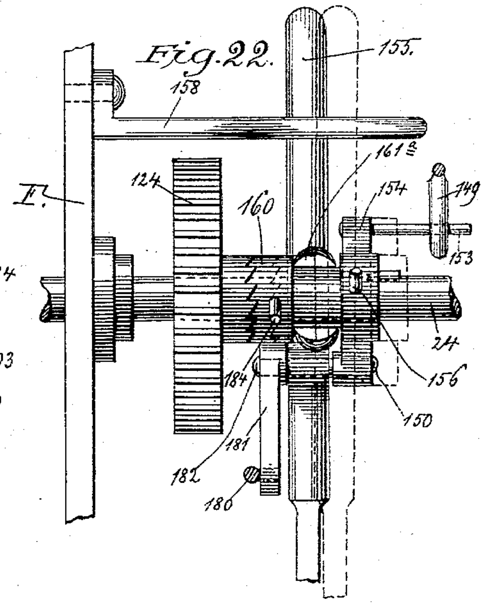
Fig. 22.
Fig. 23.
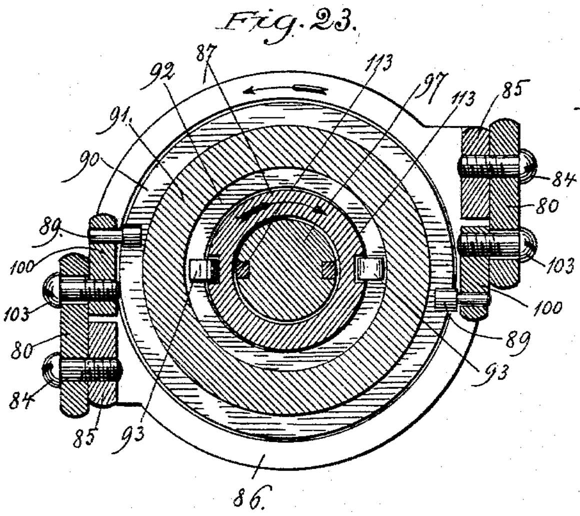
Witnesses.
Chas. H. Baker
D. W. Edelin
Inventor:
Humphrey J. Williams.
by Risley, Robinson & Love
Attorneys.
THE NORRIS PETERS CO., PHOTO-LITHO., WASHINGTON, D. C.

(No Model.)

10 Sheets—Sheet 9.

H. J. WILLIAMS.

ORANGE WRAPPING MACHINE.

No. 533,516. Patented Feb. 5, 1895.

WITNESSES:

Pierrepont Barstow

Edwin W. Risley

INVENTOR.

H. J. Williams

BY

Risley, Love & Perry

ATTORNEYS.

THE NORRIS PETERS CO., PHOTO-LITHO., WASHINGTON, D. C.

(No Model.)

H. J. WILLIAMS.

ORANGE WRAPPING MACHINE.

No. 533,516. Patented Feb. 5, 1895.

WITNESSES.

Rich. George

Edwin H. Risley

INVENTOR.

H. J. Williams

By Risley Love & Parry

Attys

THE NORRIS PETERS CO., PHOTO-LITHO., WASHINGTON, D. C.

UNITED STATES PATENT OFFICE.

HUMPHREY J. WILLIAMS, OF NEW YORK MILLS, NEW YORK, ASSIGNOR, BY MESNE ASSIGNMENTS, OF ONE-HALF TO GRACE C. WARNER, OF PENN, FLORIDA.

ORANGE-WRAPPING MACHINE.

SPECIFICATION forming part of Letters Patent No. 533,516, dated February 5, 1895.

Application filed April 26, 1886. Serial No. 200,239. (No model.)

*To all whom it may concern:*

Be it known that I, HUMPHREY J. WILLIAMS, of New York Mills, in the county of Oneida and State of New York, have invented certain new and useful Improvements in Orange-Wrapping Machines; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

My invention relates to mechanism for wrapping oranges with paper, and includes, also, mechanism for feeding the oranges, cutting the paper for wrappers, and printing the wrappers.

Other fruit or things, other than oranges, may be wrapped by this machine, and the word "orange" or "oranges" are used throughout the specification as meaning any fruit or thing that the machine may be operated upon.

In the drawings, similar letters and numerals of reference refer to corresponding parts in the several figures.

Figure 2:
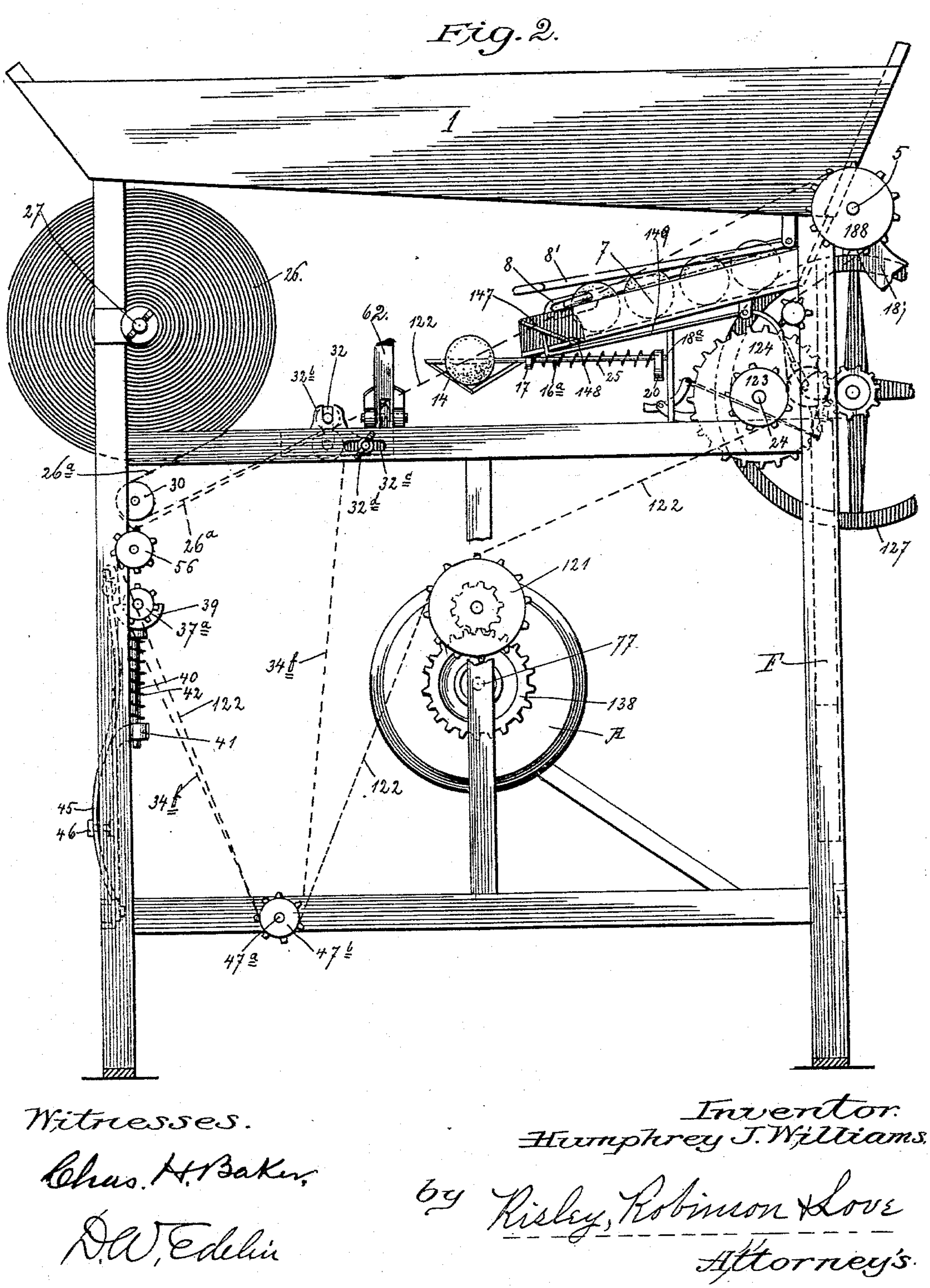
Figures 3, 3A, 4:
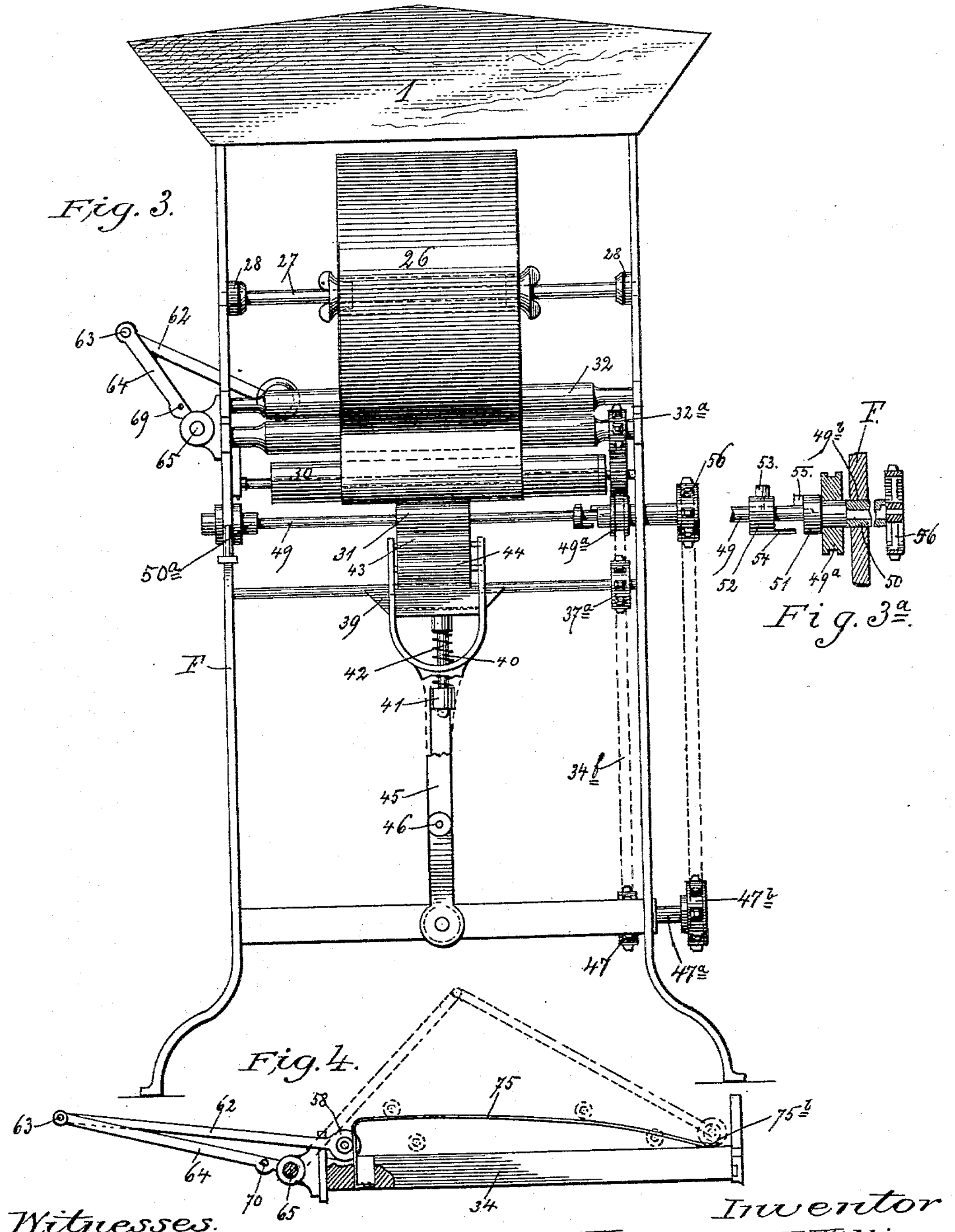
Figure 5:
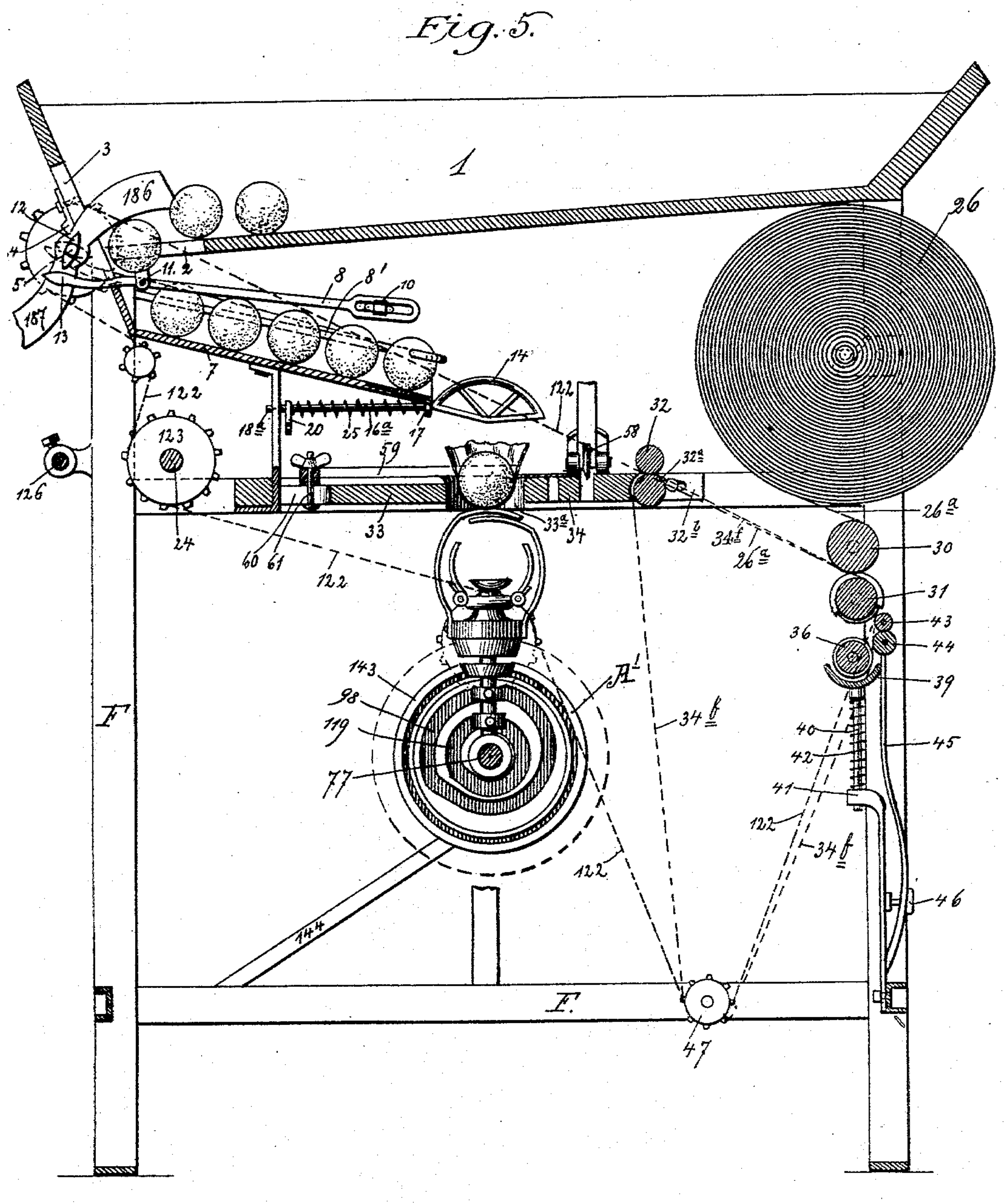
Figures 6, 7, 8, 9, 10:
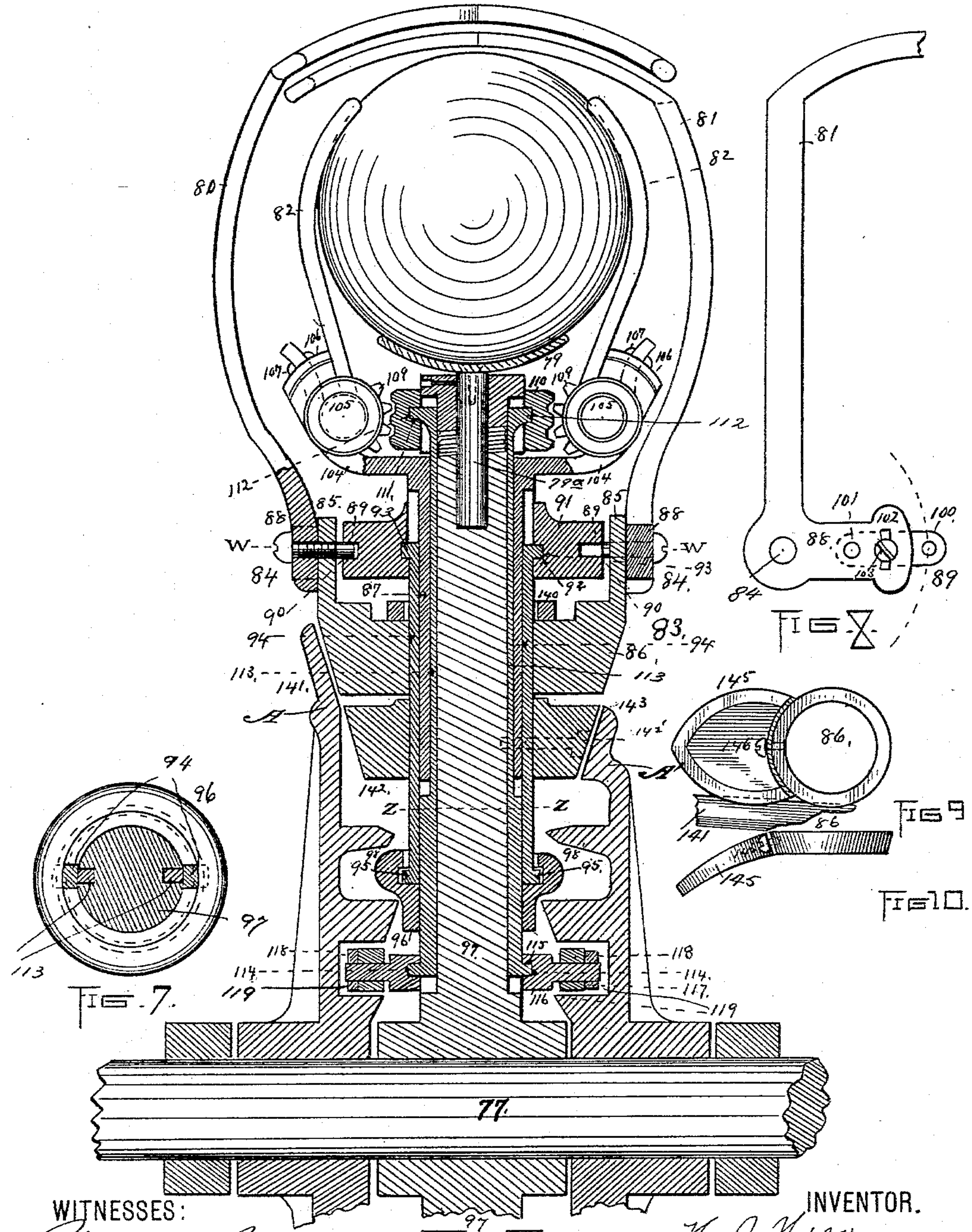
Figures 16, 17, 18, 19:
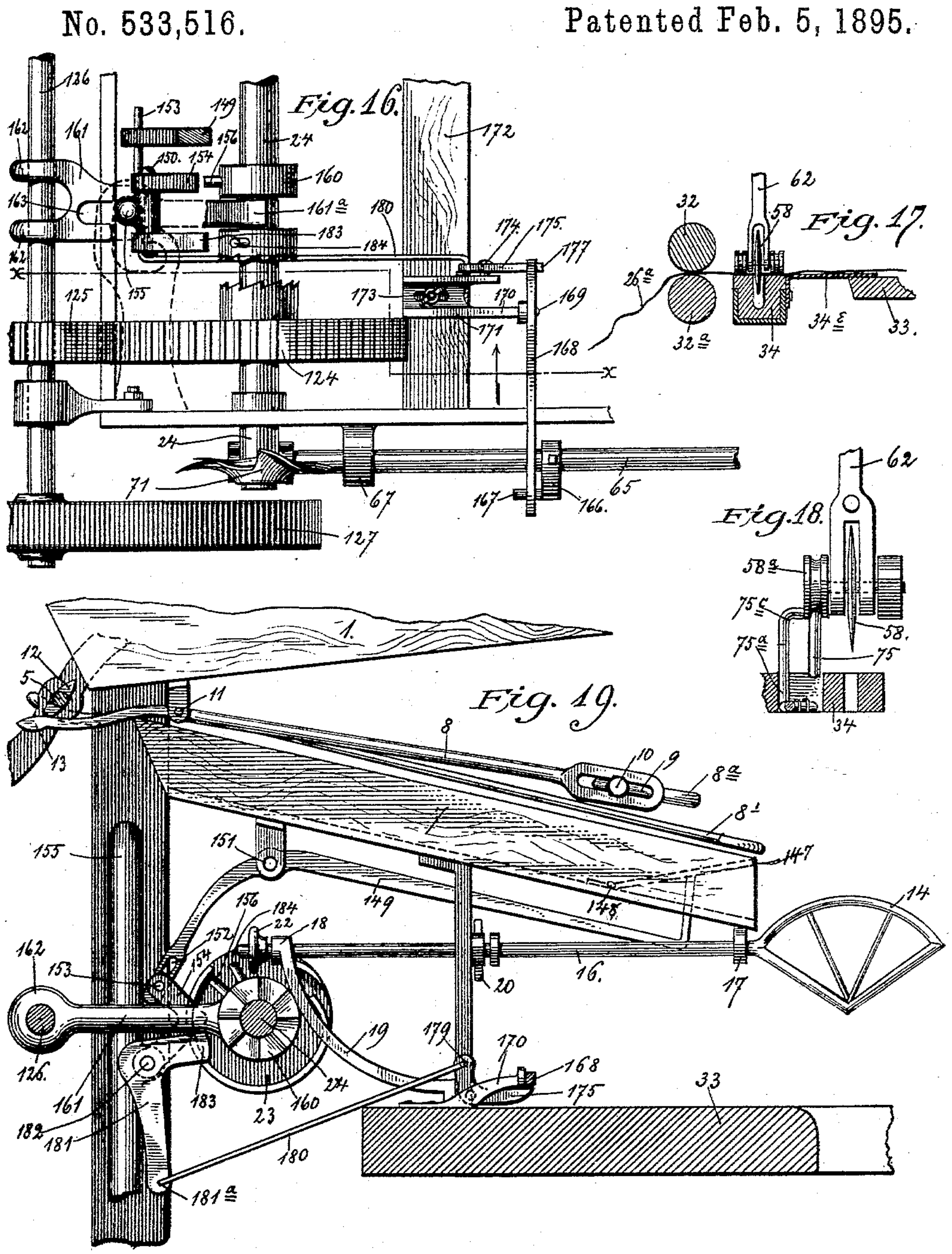
Figure 24:
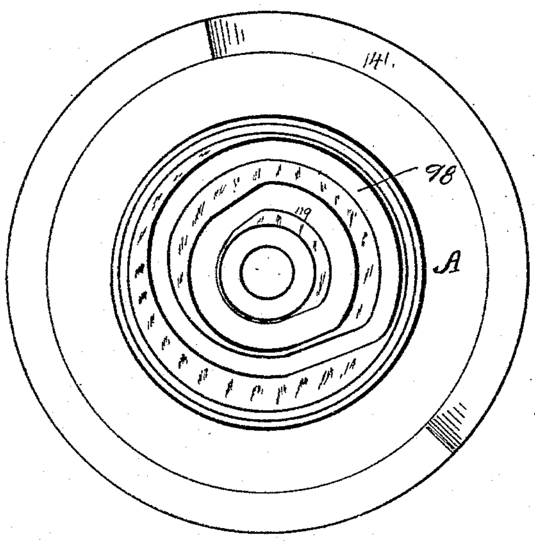
Figure 25:
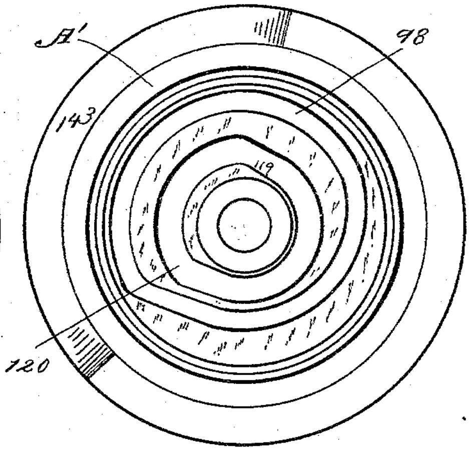
Figure 26:
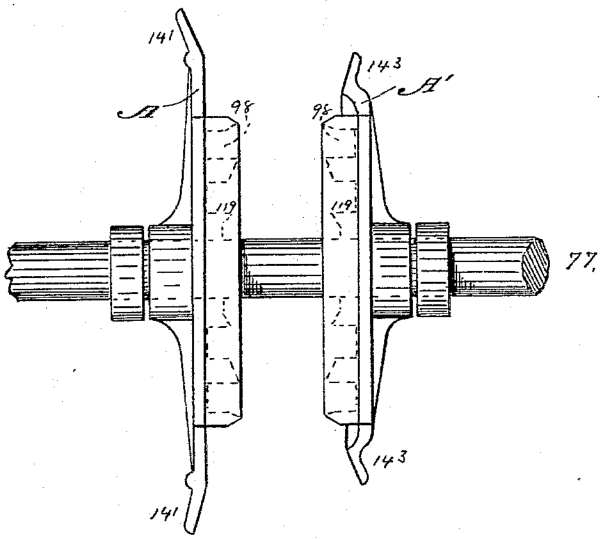
Figures 27, 28, 29, 30, 31, 32, 33, 34, 35, 36, 37, 38, 39:
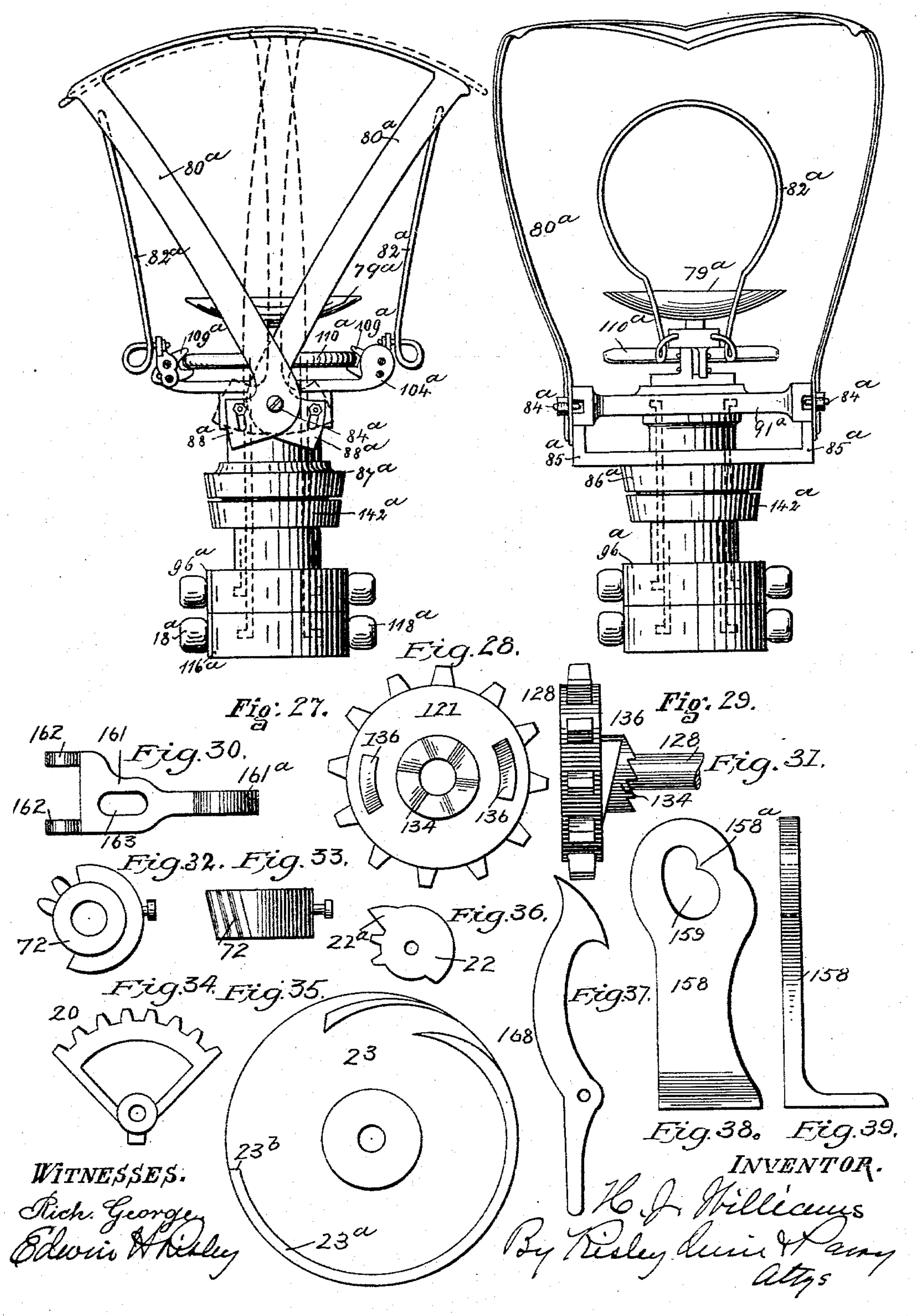

Figure 1 is a plan view of the machine with the hopper removed. Fig. 2 is a side elevation of the machine. Fig. 3 is one end view. Fig. 3ᵃ shows details of mechanism for operating the printing devices. Fig. 4 shows details of the paper-cutting mechanism. Fig. 5 is a vertical middle section of the machine taken on a line substantially with A—B of Fig. 1. Fig. 6 shows one of the holding and twisting arms, or mechanisms mostly in central section and including the actuating mechanism. Fig. 7 is a cross section taken on line Z—Z Fig. 6. Fig. 8 is a side view of a portion of one of the jaws for collecting, holding and twisting the paper wrapper. Fig. 9 is a plan view of a friction pulley and a device for preventing the rotation thereof, constituting an extra attachment, resulting in a modified manner of operating the machine. Fig. 10 shows a side view of the same parts. Fig. 11 is the opposite end view from that shown in Fig. 3. Fig. 12 shows details of the mechanism for operating the orange dropping trap. Fig. 13 shows in detail from side, a worm-gear used in operating the paper-cutter. Fig. 14 shows an end view of the same gear. Fig. 14ᵃ shows details of construction partially in section, of mechanism for driving the orange wrapping mechanism and bringing the arms thereof momentarily to a halt. Fig. 15 shows in side elevation a small cam disk used in operating the paper-cutter. Fig. 16 is a plan view, mostly, of automatic stopping mechanism, being the parts below the line C of Fig. 11. Fig. 17 shows details of the paper-feeding and cutting mechanism, mostly in cross section. Fig. 18 shows other details relating to the paper cutting mechanism. Fig. 19 shows details relating to the automatic stop mechanism and includes other details of the right-hand end of the machine, as shown in Fig. 2. Fig. 20 shows a plan view of the end of the holding and twisting device in the position which the parts assume when twisting the wrapper on an orange. Fig. 21 shows one of the pair of fruit-holding fingers forming a part of the holding and twisting mechanism. Fig. 22 shows details relating to the automatic stop mechanism, the parts shown being as seen from the right of same parts in Fig. 16. Fig. 23 shows a section of one of the holding and twisting arms, taken on line W—W of Fig. 6. Fig. 24 shows the inner face of the larger of the two cam plates for actuating the holding and twisting devices, showing also the stationary friction face from which the wrapper holding jaws are rotated. Fig. 25 shows the inner face of the smaller of the two cam plates for actuating the holding and twisting mechanism, showing also the stationary friction face from which the orange-holding fingers are rotated. Fig. 26 shows an edge view of the two stationary cam plates mounted on the shaft which supports them. The cam plates in this figure are slightly modified from those shown in Figs. 24 and 25, in that a part of the circular outline of the plates which perform no office, is omitted. Fig. 27 shows one view of a modified form of construction of parts of the holding and twisting mechanism. Fig. 28 shows a side view of a sprocket wheel employed in driving the holding and twisting mechanism. Fig. 29 shows the same as Fig. 27 with parts in a different position. Fig. 30 shows a clutch shifter employed in the automatic stop mechanism. Fig. 31 shows an edge view of the sprocket wheel shown in Fig. 28. Fig. 32 shows a side view of a mutilated worm gear of a slightly modified form of construction from that shown in Fig. 13. Fig. 33 shows an edge view of the gear shown in Fig. 32. Fig. 34 shows a gear sector used in operating the orange dropping trap. Fig. 35 shows a scroll cam which operates the dropping trap. Fig. 36 shows a cam gear of a slightly modified form of construction from that shown in Fig. 12 and employed in the dropping trap mechanism. Fig. 37 shows a tripping lever employed in the automatic stop mechanism. Fig. 38 is a side view and Fig. 39 an edge view of a holding bracket for the stop mechanism lever handle.

In constructing the machine there is provided a suitable frame F, preferably of the form shown in the accompanying drawings, although any other suitable construction or frame may be used. On the top of this frame I provide an inclined hopper I (Figs. 2 and 5) of sufficient size to hold a suitable quantity of oranges. At the lower end of this hopper, at the bottom, I provide opening 2 (Fig. 5) of a suitable size to allow the free passage of a single orange. This opening in the hopper is adjustable with reference to the size of the article, by means of an adjustable door 3 (Figs. 2 and 4). This door is hinged at the top leaving the lower part free to move in and out, which movement is effected by a slotted wedge 4 (Figs. 5 and 11) fitting between the adjustable door and shaft 5. This wedge has slot 6, (Fig. 11) through which slot a screw passes and is engaged with the adjustable door by means of which the adjusting wedge may be moved up or down for contracting or enlarging the opening in the hopper to adjust it to the size of the article. As oranges pass through opening 2 in the hopper, they fall into an inclined chute 7 (Figs. 2, 11 and 19) constructed and arranged to receive and conduct a row of oranges from opening 2 in hopper to the automatic trap.

For controlling the movement of the oranges in the inclined chute, I provide two moving arms 8, 8′ (Figs. 2, 5 and 19). One of these arms is provided with an adjustable hook $8^a$ for accommodating articles varying in size. This adjustable hook is adjusted by means of slot 9 (Figs. 5 and 19) and set-screws 10 passing through the slot and engaging the arm. The moving arms are pivoted at 11, (Figs. 2, 5 and 19) to the hopper or frame and are alternately moved up and down by cam-shaped trippers 12, 12, (Figs. 5, 11 and 19,) mounted on the shaft, which alternately engage the arms at 13, (Figs. 5 and 19.) The oranges in the inclined chute are discharged one at a time from the end of the chute.

Underneath the discharge end of the inclined chute, I provide an automatic trap 14, (Figs. 1, 2, 5 and 19) for receiving and dropping each orange through an aperture in the table. I preferably construct the trap of quarter shell globes or frames. (Other shapes may be used.) My automatic trap is adapted to close and open for the reception and discharge of each orange. The trap drops the orange on to the wrapping paper covering the aperture in the table directly under the trap, through which opening the orange and paper are carried by gravity.

15, 15′, (Fig, 1) represent separate sections of my automatic trap 14. Each section is carried by arms 16, $16^a$ (Figs. 1, 2, 5 and 19) respectively supported in suitable bearings underneath the chute. The arms are supported at the discharge end of the chute in bearings 17 (Figs. 2, 5 and 19.) The rear end of the arm $16^a$ is supported in bearing $18^a$ (Figs. 2 and 5). The rear end of arm 16 is supported in bearing 18, on brace 19, (Fig. 19.) Mounted on the arms and rigidly held thereto are two quarter gear sectors 20, 20, (Figs. 2, 5, 19 and 34) which are constructed and mounted to mesh with each other. On the end of one of the arms 16 I provide a toothed-scroll-wheel 22, (Figs. 11, 12, 19 and 36) which is rigidly held thereto for engaging scroll cam 23, (Figs. 11, 12, 19 and 35) mounted on shaft 24. This shaft 24 is mounted in suitable bearings on the frame. The teeth or projections on the side of the scroll cam engaging the teeth of the toothed-scroll-wheel 22, by which mechanism when power is applied to drive the machinery the long arm 16 having the toothed cam wheel 22 attached thereto serves to move the quarter sections of the trap together to receive and retain the orange as shown in Figs. 1 and 2. There are two circular projections on the face of cam 23 (Fig. 35) to engage the two teeth on gear sector 22. The two are engaged and the trap moved into position to receive an orange. One of the teeth of cam 23, is moved onto the last circular projection and rides on rim $23^a$ until it reaches the end thereof $23^b$, when the trap is instantly opened by the operation of torsional spring 25, (Fig. 5;) one end of the spring being rigidly held in the bearing of the arm and the opposite end secured to the arm. The trap is prevented from opening too far by shoulder $22^a$ on gear sector 22 coming in contact with the periphery of the cam.

For supplying the paper to be wrapped on each orange and printing such wrapper, I provide a roll of paper wound on a spool or shaft.

26 represents the roll and $26^a$ the strip of paper.

27 is the shaft on which the roll of paper is carried, which is mounted in bearings 28, 28, (Fig 3) supported in the frame in such a manner as to allow the continuous strip or web of paper to be unwound and passed over printing roller 30, having a smooth surface and mounted in suitable bearings in the frame. The paper passes between printing roller 30 and type-roller 31. The type-roller 31 is provided with the required type for producing the desired impression on the paper, as the same passes between the rollers. The paper after passing between rollers 30 and 31, is passed between feed rollers 32, $32^a$, (Figs. 1, 2, 3 and 5) by which the paper is moved forward on the surface of the table 33, across and over grooved track 34, (Figs. 1, 4, 5 and 18) and over the circular opening $33^a$ in the table provided for the passage of oranges as they are dropped from the trap. The feed rollers 32, $32^a$, are mounted in adjustable brackets $32^b$ back of the grooved track 34. The grooved track 34, together with the cutter which moves in the track, and connected mechanism, are secured to the same brackets and all are horizontally adjustable on the frame by means of slot $32^c$ in the frame, and thumb-screw bolt $32^d$ passing through the slot and engaging the brackets $33^d$. The purpose of this adjustment is to regulate the length of paper used on articles varying in size. Attached to grooved track 34 and adjustable therewith, I provide apron $34^e$, which is adapted to carry the paper over the opening between the table and track.

The system of rollers before mentioned for printing and feeding the paper over the opening in the table, are driven by endless link belt $34^f$, engaging and moving on a sprocket-wheel mounted on the end of the lower feeding roller $32^a$, thence around a plain pulley $49^a$ on shaft 49, thence around sprocket-wheel $37^a$ on shaft 37, thence around sprocket wheel 47 secured on a shaft $47^a$ in the lower portion of the frame and thence back to the sprocket on roller $32^a$.

The paper is moved forward on the table by feed rollers 32, $32^a$, between adjustable guide-cleats 59, 59, (Fig. 1) on the surface of the table. These guides are adjustable for accommodating paper varying in size, by a slot in the table with a bolt and thumb-screw for securing the guides to the table.

60 indicates the slot in the table, and 61 the thumb-screw, (Fig. 5.)

I provide mechanism for applying ink to the type mounted on the type-roller, by means of an ink-roller 36, (Fig. 5) mounted on shaft 37, (Figs. 3 and 5) driven by sprocket $37^a$. The ink may be supplied to the roller, by brush, but I provide an ink-vat 39, (Fig. 2) having a projecting stem 40 constructed to move in bearing 41, on the frame and vertically movable by coil spring 42 on the stem, which keeps the ink-vat or brush in contact with ink-rollers, or substantially so, as the ink-roller 36 revolves, it may carry with it sufficient ink from the vat which is communicated to the type-roller through intermediate distributing ink-rollers 43 and 44, the lower one running in contact with the ink-roller, and the upper one in contact with the type on the type-roller 31; the two intermediate rollers running in contact with each other, whereby ink is distributed and properly applied to the type. The intermediate rollers are mounted on a spring arm 45, (Figs. 2 and 3) attached to the frame, and is adjustable by set-screw 46 for regulating the tension of the intermediate rollers against the type and ink roller.

I also provide mechanism for adjusting the working parts of the machine to supply paper varying in length to accommodate articles varying in size. I accomplish this by providing sprocket-wheels similar to that shown at 47, (Fig. 3,) varying in size, having reference to the articles to be supplied with paper. The endless link-belt driven over this sprocket should be kept substantially taut. When different sized sprockets are used, I adjust feed rollers 32, track 34, the circular knife and connecting mechanism, as before set forth, so as to cut the paper of required length for the article and to correspond with the size of sprocket used. For printing with the same mechanism before described, on paper varying in length, I construct my type-roller 31, with a cut-away surface 48, (Fig. 5.) The type-roller should be constructed with a circumference equal to the shortest paper required for use on the orange. The type-roller is mounted on shaft 49 (Fig. 3) and is supported at one end in bearing $50^a$ in the frame, (Fig. $3^a$.) The opposite end is loosely mounted as a bearing in collar 51, (Fig. $3^a$) fixed on sleeve $49^b$, constituting a detached portion of shaft 49. I provide adjustable collar 52, adjustable on the shaft by set-screw 53 (Fig. $3^a$). This collar has projection 54 for engaging a corresponding projection 55 on collar 51. These projections are constructed with reference to their engaging each other. When a paper varies in length from the shortest used, collar 52 is adjusted on the shaft 49 to start the printing roller into operation, and it then runs ahead by engaging with the paper until it comes to the cut-away portion 48, where it stops until the shoulder 55 comes up by regular movement of the sprocket-chain operating on sprocket 56. The cut-away surface 48 of type-roller 31 is provided for the passage of the paper between the rollers, while projection 55 is coming up to projection 54, and thus start the type-roller again into frictional contact with the paper on the type-roller and to run ahead therewith again as before described.

It is quite apparent that the whole printing device may be omitted.

For cutting the paper of required length ready to be wrapped on each orange, I provide the adjustable track 34, hereinbefore described, having a groove of sufficient width to accommodate the circular cutter 58, (Figs. 4, 17 and 18.) This cutter is mounted on jointed arm 62, (Figs. 1, 3, 4, 17 and 18,) jointed at 63 to the shoulder section 64, fitted loosely on shaft 65, (Fig. 1.) The shaft is mounted in suitable bearings 66 and 67, (Figs. 1 and 16) on the frame. On this shaft I provide crank 68, (Fig. 1) which is rigidly secured thereon. The crank-pin 69 passes through perforations 70 in the shoulder section 64 of the jointed arm 63, (Figs. 3 and 4) and should be of sufficient length to accommodate the horizontal adjustment of the circular knife, grooved track and feed-rollers, as heretofore described.

The circular knife with the connecting mechanism heretofore described, is operated by providing a tooth-cammed disk 71, (Figs. 1, 11, 15 and 16) mounted on shaft 24. The cam disk engages gear sector 72, which is rigidly held to shaft 65; the tooth-cammed disk being adapted to engage the teeth on the gear sector, whereby the cutter and arm are moved from the position shown in dotted lines in Fig. 4, to that shown in full lines in the same figure. As the cutter is moved from the position shown in dotted lines to that shown in full lines in Fig. 4, the cutter travels over the elevated track 75, the hub $58^a$ of the cutter running on the elevated track. The track 75 is secured at one end to the grooved track 34 at $75^a$ and the other end of the track, $75^b$, simply rests on the top of the track 34, being held down by the spring tension of the track itself. As the cutter travels over the track 75 in the movement described, it is carried over the strip of paper $26^a$, being fed onto the table 33. When the hub $58^a$ of the circular cutter reaches the end of the track which is secured, it passes by a shoulder or bend therein, as shown at $75^c$, and drops off on to the track, the cutter passing into the groove or slot into the track 34.

When the cam 71 has rotated into position to bring the cut-away portion 76 thereof opposite the toothed-scroll-wheel 72 with which it engages, the shaft 65 is rocked quickly in the opposite direction from which the scroll moves it by the action of the spring 73 wound on shaft 62, one end of which is secured in the bearing 66 and the opposite end in the collar 74 on the shaft 65. The partial rotation of the shaft 65 by the spring 73 moves the jointed arm 62 from the position shown in full lines in Fig. 4 to that shown in dotted lines in the same figure. In this movement the cutter 58 is carried rapidly along the track 34 and severs the strip of paper lying across the track, leaving a piece of sufficient size to cover an orange. In the cutting movement of the cutter 58, the hubs $58^a$ thereof rest on the track 34 and the paper thereon and give a rotary motion to the cutter which readily severs the paper without disturbing its position on the table.

Underneath the opening $33^a$ in the table through which the fruit is dropped, I provide an automatic holding, rotating and twisting device for grasping the orange and the paper and twisting the paper on the orange. The orange and paper holding and twisting devices are mounted on a shaft 77, which shaft has suitable bearings in the frame and is provided with a cogged gear 138 mounted thereon through the medium of which the orange and paper twisting devices are driven.

Secured on the shaft 77 and projecting radially therefrom so that their ends will swing opposite the opening $33^a$ in the table, are provided one or more fixed arms or radial shafts or spindles 97, depending on the number of holding and twisting devices required; two or three being the usual number; two being shown in Fig. 11 of the drawings, and one in Fig. 5. On the end of the radial arm 97 is secured a circular seat 79 which is mounted on and carried by a spindle $79^a$ engaging in a hole in the end of the arm. On the seat 79 the orange or fruit is adapted to drop when falling through the opening $33^a$ in the table and on which it rests while the paper is being secured or wrapped on the orange. On the arm 79 is mounted a rotatable sleeve 87 which carries arms 104, 104, at its upper end and the bevel-faced friction pulley 142 at its lower end. The orange-holding fingers 82 are mounted on pin 105, carried in the outer ends of arms 104 and make a convolution or two around the pin 105 to give an elastic spring tension and have their ends passed through the holes 108 in adjusting plates 106. The plate 106 is provided with a transverse slot through which the clamping set-screw 107 passes and binds the plate on a projecting end of the toothed sector 109. Sector 109 is mounted on pin 105 and its teeth engage in the external grooves of ring 110 mounted loosely on the outer end of spindle or arm 97 so as to have a lateral movement on the arm. The ring 110 is provided with an internal groove 111 in which engage the projections 112 on the upper ends of the two sliding keys 113, 113. These keys 113 are secured in key-seats in the body of the spindle 97 and extend to the base portion of the spindle where they are provided with projections 114 which engage in internal groove 115 of collar or ring 116 loosely mounted on the base of spindle 97 and adapted to slide along the spindle. The ring or collar 116 is provided with projecting journals 117 carrying rollers 118 which engage in the corresponding cam grooves 119, 119, in cam plates A and A′. The cam grooves 119 together with the connections described extending to the fingers 87 operate to open and close the fingers as the arm or spindle 87 travels around the shaft 79. The fingers are rotated about the axis of the arm or spindle as the spindle travels around the shaft 77, (or at least during a portion of the travel) by the bevel friction pulley 142 engaging with the stationary friction surface 143 of cam plate A′.

The wrapper holding closing and twisting jaws 80, 80, are provided with V-shaped ends, as clearly shown in Fig. 20, and these ends are arranged in close proximity to each other and adapted to close into the position shown in full lines in Fig. 20 in holding the wrapper while the same is being twisted and to open into the position shown in dotted lines in the same figure to receive and discharge the orange. The jaws 80, 80, are pivoted at 84 to ears 85 on substantially opposite sides of the friction pulley 86, and are provided with a bell-crank portion carrying an adjustable extension 100 pivoted to the bell-crank portion of the jaw at 101 and adjustable by provision of slot 102 and set-screw 103, all as shown in Fig. 8. In the adjustable extension of the jaws 80 is provided a pin 89, which engages in the external groove 90 of collar or ring 91. Collar or ring 91 is mounted loosely on sleeve 87 to slide along the sleeve and is provided with internal groove 92 which receives the projections 93, 93 on the upper ends of sliding keys 94, 94. The keys are received in key-seats in the exterior surface of sleeve 87 and extend toward the shaft 77 and are provided with projections 95 which engage in the internal groove in collar 96 surrounding the lower end of the spindle 97. The projecting portions of collar 96 engage in the corresponding cam grooves 98, 98 in the cam plates A and A'. The office of the cam grooves 98, 98 is to open and close the jaws 80, 80, as the spindle 97 travels around the shaft 77. The jaws are rotated around the axial line of the spindle 97 in the opposite direction from that of fingers 87 as it travels, (at least during a part of its revolution,) by the friction pulley 86 on stationary friction face 141 of cam plate A. The shape of the cam grooves 98 and 119 are such that the jaws and fingers will be closed immediately after they leave the opening $33^a$ in the table, and as to the jaws, preferably closing them more tightly for a short distance. The jaws and fingers remain closed until the spindle 97 has reached an inverted position, when by an abrupt change of direction of the cam groove, they are opened.

Each of the spindles 97 with its wrapping and twisting mechanism should be brought momentarily to a halt as the end of each spindle comes under the feed opening or hole $33^a$ in the table. For this purpose there is provided between the sprocket 121 which drives the wrapping mechanism and the gear pinion 132 which transmits the power, the automatic clutch device shown in Fig. $14^a$. The sprocket 121 is mounted on a short shaft 128 and is provided with two inclined teeth 136 and a clutch member 134 on its inner side. (See Figs. 28 and 31.) The clutch member is adapted to engage with clutch teeth on one end of sleeve 129, and on the other end of this sleeve is provided the gear pinion 132. The clutch member 134 is thrown out of engagement with the sleeve in each revolution by the inclined teeth 136 riding up the stationary inclined teeth or projections 135 on the frame, (Fig. 11.) The clutch is thrown in by the spring 131 acting between the side of the pinion 132 and the nut 130 on the end of the shaft 128. By a proper arrangement of the teeth and arrangement of the relative sizes the gears 132 and 138, the wrapping devices will be brought momentarily to a halt as they come under the spring $33^a$ in the table.

There is provided automatic stop mechanism controlled by the orange feeding devices and the paper cutting devices and adapted to operate either when the oranges fail to feed or the wrapper cutter fails to operate.

On the shaft 24 is splined a movable clutch part 160, capable of a lateral movement on the shaft and adapted to engage with the clutch member on the hub of gear-wheel 124, which runs loose on the shaft 24 and is driven by pinion 125 on shaft 126. The driving-wheel 127 is provided on shaft 126. Clutch member 160 is operated by a clutch shifter 161 which engages the same by means of its forked or semi-circular end $161^a$ engaging in a groove in the clutch part. The clutch shifter has eyes 162, 162, by means of which it is mounted on shaft 126 so as to be laterally movable, and is also provided with a slotted opening 163. The clutch operating handle 155 passes through opening 163 as well as through the heart-shaped opening 159 of holding bracket 158 and extends to and is secured to the lower portion of the frame. The lower part of handle 155 is spring tensioned to throw the clutch member 160 out of engagement with the clutch part of gear 124. The clutch is meshed when the handle is engaged back of the projection into the heart-shaped opening 159 of the bracket 158 and is thereby held, (Figs. 22 and 16.) On one side of the handle below the shifter and at 150 is pivoted the tripper 154. This tripper will be called the "orange" tripper. The tripper 154 when not held out of the way, is adapted to be struck by the pin 156 projecting from the clutch 160. The upper arm of the tripper 154 is provided with an extended pin 153, (sufficient to accommodate the lateral play of the clutch,) which pin engages in slotted opening 152 in the end of tripper lever 149. Tripper lever 149 is pivoted at 151 to an arm projecting from the under side of the chute 7, (Figs. 11 and 19) and has a surplus of weight in its slotted end, and is provided with a finger which extends through an opening in the under side of the discharge end of chute 7 and engages plate 147 hinged at 148 in the bottom of the chute. On the opposite side of the handle 155 from the "orange" tripper and at 182, is pivoted the "paper" tripper 181, of substantially bell-crank shape and having its end 183 adapted to be struck by the projecting pin 184 on the clutch 160 when not held out of the way. A connecting-rod 180 connects the tripper 181 with a bell-crank lever 175, being attached to each at $181^a$ and 179 respectively. Lever 175 is pivoted at 174 to the side of stand 171 and is operated by lever 168, (Figs. 16 and 37.) Lever 168 is pivoted at 169 to an arm 170 of stand 171 and is adapted to be operated by the pin 167 in collar 166 secured on rocking shaft 65. Stand 171 is secured by a set-screw 173 on girt 172.

The operation of the machine is substantially as follows: The oranges are placed in the hopper 1 and are fed through the opening 2 into the chute 7, being stirred at the opening by stirrers 186, 187 in the chute 7. They roll down until they are held by the hooked arms 8 and 8', as shown in Fig. 5, These arms are alternately raised, allowing a single orange to pass into the interval between the short and long hooked arm, and while the short arm is down holding the oranges, the long arm rises and allows the orange to run out of the chute into the trap 14. From the trap 14 the orange is dropped on to the wrapper lying on the table over the opening 33ª therein and by its momentum carries the wrapper through the opening, closing the edges of the wrapper around the orange, as shown in Fig. 5. The orange then falls through the open jaws 80 between the open fingers 82 on to the seat 79. When the orange has landed on the seat 79 the timing of the orange-wrapper driving mechanism is such that the spindle 97 will immediately start away from the opening 33ª and on its travel around the shaft 77. Immediately upon its starting and by an abrupt change in the direction of the cam grooves 98 and 119, the fingers 82 are closed on to the orange surrounded by the wrapper and the jaws 80 are closed on to and fold the edges of the wrapper and the fingers holding the orange revolving in one direction and the jaws gripping the edges of the paper revolving in the opposite direction, forming the twist in the wrapper and twisting the same on the orange. The cam groove 98 which controls the movement of the paper holding jaws is preferably such that they will gradually tighten on the edges of the wrapper during the first part of the twisting. As the arm travels around the shaft 77 and twists the wrapper onto the orange, as described, it becomes inverted and when it reaches an inverted position, by another change of direction in the cam grooves 98 and 119, the jaws and fingers are opened dropping the fruit out of the holding and twisting mechanism and the jaws and fingers move forward in the open position until they come again beneath the opening in the table in position to receive an orange. One, two, three or more of the twisting devices may be located around the shaft 77 and each simultaneously performing one of the several movements just described. As the holding and twisting devices come beneath the opening 33ª in position to receive an orange, they are brought momentarily to a halt by the teeth 136 on the back of the driving sprocket 21 riding up the inclined projections 135 on the frame, throwing the clutch 134 out of engagement and allowing it to lose or skip one or more teeth. Previous to the dropping of each orange the wrappers are fed onto the table 33 between the guides 59 by the rollers 32 drawing on the strip of wrapping-paper 26ª which passes from the roll of paper 26 around the printing roller 30 and is suitably printed by the type-roller 31 supplied with ink, as before described. When a sufficient length of paper has been fed onto the table to form a wrapper the adjustment of parts is such that the circular cutter 58 will be moved quickly across the grooved track 34 severing the paper at that point without disturbing it on the table. The cutter 58 is actuated in its cutting movement by the spring 73 coiled on the rocking shaft 65 and operating through the medium of the jointed arm 62 to move the cutter. After the cutter has severed the paper and while another wrapper is being fed onto the table the cutter is returned into starting position, passing over the elevated track 75; this movement being caused by the cam plate 71 and cam gear 72 on the end of the rocking shaft 65.

In the operation of the trap, the parts of the trap are closed by the action of the scroll-like teeth on the side of cam 23 on the teeth of the cam gear, and when closed is so held until the instant when it should operate by the tooth of 22 riding on the rim 23ª. When in the regular revolution of the cam 23 the end 23ᵇ of the rim 23ª passes the gear 22, the trap is instantly opened by the action of spring 25.

In case the oranges should fail to feed and an orange not occupy the place between the short hooked arm 8 and the long hooked arm 8′ in chute 7 and rest on plate 147 and hold it down, the plate would be raised into the position shown in Fig. 2 by reason of the surplus of weight in the slotted end of lever arm 149, and when so raised it allows the tripper 154 to swing into position to be struck by pin 156, and when so struck the lever handle 155 is moved to the left as shown in Fig. 19, to disengage it from projection 158ª (Fig. 38), when by the action of the spring portion of handle 155, it and the clutch member 160 is instantly moved from the position shown in full lines in Fig. 22 to that shown in dotted lines, throwing the machine out of gear. By placing an orange in the chute 7 between the hooks of the long and short arms 8 and 8′ and depressing the plate 147 and moving the handle 155 into the portion of the opening 159 toward the bracket base and engage it behind projection 158ª the machine is again placed in gear. Each time that the shaft 65 rocks in operating the wrapper cutter, the crank 166 is turned upward and through levers 168 and 175 draws on connection 180 to elevate the projecting end 183 of paper cutter tripper to such a position that it will not be struck by the pin 184 as the shaft 24 revolves. In the event that the wrapper cutter fails to operate, the mechanism before described will fail to get the projecting end 183 of the tripper out of the way and the same will be struck by pin 184 and the clutch thrown out, as described with reference to the orange tripping mechanism.

The operation of the wrapping mechanism may be modified or changed so that the orange holding fingers will not rotate, in which case the twist in the wrapper is made by the rotation of the wrapper holding jaws. This is accomplished by relieving the friction plate A′ so that the beveled pulley 142 will not engage on the friction face 143, and by placing a screw 142′ (Fig. 6) in the hole provided in pulley 142 for that purpose, which screw extends through the pulley and engages in the solid body of spindle 97. This holds the fingers 82 from rotation while permitting them to perform their other function as heretofore described.

By the use of the attachment 145, shown in Figs. 9 and 10, the operation is changed so that the wrapper holding jaws 80 do not revolve, and the twisting of the wrapper is effected by the revolution of the orange by the finger 82 alone. In using the attachment 145, the friction plate A is relieved so that the pulley 86 will not engage the friction face 141 thereof. The attachment 145 is then applied to the face of the pulley 86 and secured thereon by screw 146. As the arm or spindle 97 travels around the shaft 77 the pulley 86 carrying the wrapper holding jaws, not only does not rotate, but is held from any tendency to rotate in unison with fingers 82 by the attachment 145 striking against the friction face 141.

In order to furnish wrappers of various sizes for various sizes of fruit, the cutter 58 together with the track on which it is mounted and the feeding rollers, all mounted on the brackets $32^b$, may be adjusted toward or from the feed opening $33^a$ by loosening the screws $32^d$ and sliding the parts and a larger or smaller sprocket wheel 47 is used.

The modified forms of holding and twisting devices shown in Figs. 27 and 29 have the jaws $80^a$, $80^a$, each with two arms instead of one, as in the previous figures. These arms on each side are pivoted at $84^a$ on a common pivotal point and are provided with bell-crank portions $88^a$ similar to those described, having pins extending into collar $91^a$. Collar $91^a$ is modified from collar 91 heretofore described, in that it has arms which receive the projections from the jaws $80^a$ and it revolves with the friction wheel $86^a$ and is not independent of it. The ears $85^a$ are similar to 85 before described, but are extended laterally to give more clearance at the base of the jaws. The collar $96^a$ for operating jaws $80^a$ differs from 96 before described, slightly in form, and is provided with projecting rollers to engage in the cam grooves 98. The collar $110^a$ performs the same function in the modified form of construction as 110 in the main construction, but is enlarged to give more capacity to the fruit holding fingers $82^a$ which are operated from the edge of the disk-like collar $110^a$ by the gear sectors $109^a$. The seat $79^b$ is the same as in the main construction. The fingers $82^a$ are rotated by the pulley $142^a$ and are opened and closed by the sliding collar $116^a$ with projections $118^a$ into the grooves 119 of the cam plates.

It is evident that numerous other alterations, modifications and changes than those described might be made without departing from my invention, and that with such modifications the mechanism might be adapted to numerous other uses than that of wrapping fruit or oranges.

What I claim as new, and desire to secure by Letters Patent, is—

1. In an orange wrapping machine of the character described, having one or more arms extending radially from a shaft and adapted to be rotated around the shaft in combination with the intermittently opening and closing spring arms for receiving and holding the orange and the paper wrapped thereon mounted on the ends of the arms, and mechanism for automatically operating the arms, for the purposes stated.

2. In an orange wrapping machine of the character described, the moving fingers for receiving, holding and releasing the orange, each finger provided with one or more convolutions, combined with mechanism for operating the fingers, substantially as described.

3. In an orange wrapping machine of the character described, the combination with the pins and ears of the spring fingers wrapped on the pins held and adjustable by adjusting plate with slot and set-screw, substantially as described.

4. In an orange wrapping machine, a shaft, a radial arm, or spindle mounted on the shaft, orange-holding fingers on the end of the arm, a stationary face plate or friction surface adjacent to the arm, and a pulley or roller mounted on the spindle, connected with the fingers and running in engagement with the stationary face plate, combined substantially as set forth.

5. In an orange wrapping machine of the character described, the combination of the radial traveling arms or spindles, mounted on a shaft the sleeves fitting the arms, the pulleys or gears mounted on the sleeves, the stationary plate or surface arranged to be engaged by the pulleys and holding fingers on the sleeves, substantially as described.

6. In a wrapping machine of the character described, the combination of a radial arm a shaft, around which the arm travels, and paper holding device mounted on the arm a pulley or gear on the arm connected with the paper holding device and the stationary plate with which the pulley or gear engages, substantially as described.

7. In a wrapping machine of the character described, the combination of an orange holding device, the gear sectors mounted to operate the orange holding device, the grooved collar, the keys for engaging the grooved collar, the collar on the lower end of the keys, projections on the collar, the stationary cam whereby the orange holding device is operated, substantially as described.

8. In an orange wrapper, the wrapper feeder the rotary twister to engage the edge of the wrapper and twist them together, in combination with the clamping jaws to seize the orange and hold it from rotation.

9. In an orange wrapping machine, the combination of two movable sections forming a trap, each section of the trap mounted on a rocking shaft arm, gear sectors on the shaft arms meshing into each other, a toothed gear mounted on one of the rocking arms and a scroll cam engaged by the toothed gear whereby the sections of the trap are closed to receive the orange, substantially as described.

10. In an orange wrapping machine, the combination of the movable sections of the trap, each section mounted on rocking arm, intermeshing gear sectors on the arms, a toothed gear secured to one of the arms, a scroll cam engaged by the toothed gear and adapted to close the trap, and a spring connecting with the trap for opening the trap to discharge the fruit, substantially as set forth.

11. In an orange wrapping machine, the combination with wrapper feeding device and means for varying the feed of a type-roller for printing the labels, of a circumference equal to the length of the shortest label to be printed, mounted on a two-part shaft, projections from each of the parts adapted to engage each other, whereby, in printing longer labels, the type-roller may run ahead of the regular movement of the shaft by friction contact with the paper while the printing is being done, substantially as set forth.

12. The combination in a machine, of mechanism to receive and hold an orange with paper wrapped thereon, a collector to collect the edges around the orange and hold the edges of the paper, and a rotating mechanism to simultaneously rotate the orange and inclosing paper in one direction and the collected edges of the paper in the opposite direction in twisting the paper on the orange.

13. The combination in a machine, of a holder to receive and hold an orange wrapped with paper, a collector to collect and hold the edges of the paper, mechanism for rotating the collector and holder in opposite directions, in twisting the paper thereon.

14. The combination in a machine, of a holder for receiving an orange wrapped in the paper, a collector for collecting the edges of the paper around the orange, the holder and collector being mounted on the end of a traveling arm, mechanism for rotating the holder and collector in opposite directions, and mechanism for releasing the holder and collector.

15. In an orange wrapping machine, the combination of invertible receiving fingers for grasping the orange and paper wrapped thereon, a collector for collecting and holding the edges of the paper, and mechanism for rotating the fingers in securing the paper on the orange, substantially as set forth.

16. The combination in an orange wrapping machine, of invertible fingers for receiving and holding the fruit wrapped in the paper, a paper collector and holder and mechanism for rotating the collector in twisting the paper on the fruit, substantially as set forth.

17. The combination in an orange wrapping machine, of invertible fingers for receiving the fruit in their vertical position and releasing the fruit in their inverted position, a collector for collecting and holding the edges of the paper wrapped on the fruit, and mechanism for rotating the fingers in twisting the paper thereon, substantially as set forth.

18. In an orange wrapping machine, a holder to receive and hold the fruit with paper wrapped thereon, a collector to collect the edges of the paper around the fruit, and rotators for simultaneously moving the collector and holder in opposite directions in twisting the paper thereon, and mechanism to cause the holder to release the article, substantially as set forth.

19. In an orange wrapping machine of the character described, a holder for receiving and holding the orange wrapped with paper, a collector to collect and hold the edges of the paper, mechanism to rotate the collector holding the collected edges of the paper for forming a twist therein, and mechanism to release the holder when the paper is twisted, substantially as set forth.

20. In an orange wrapping machine, the combination of a fruit holder mounted on a traveling arm, a collector for collecting and holding the wrapping paper around the fruit, a stationary plate adjacent to the arm, a wheel mounted on the arm and connected with the holder which is operated thereby, substantially as set forth.

21. In an orange wrapping machine, the orange holder and paper collector mounted on a traveling arm, a pulley or gear connected with the collector, and a stationary face plate adapted to be engaged by the pulley or gear and operate the paper collector, substantially as set forth.

22. In an orange wrapping machine, the holder for receiving and holding the fruit wrapped in the paper, a collector for collecting and holding the paper, both mounted on a traveling arm, a stationary plate, the holder rotated by engagement with the stationary plate, combined substantially as set forth.

23. In an orange wrapping machine, a stationary track, a fruit holder and a paper collector and holder mounted on a traveling arm, a wheel connected with the paper collector and holder and moving in engagement with the track to rotate the paper collector, combined, substantially as set forth.

24. In an orange wrapping machine, a set of radial arms mounted to be rotated about a shaft, each arm provided with a holder for holding the orange and paper wrapped thereon and a paper collector to collect and hold the paper, stationary cams for operating the holder and collector, and stationary plates on which engage mechanism connected with the collector and holder in producing rotation thereof to twist the paper in securing it on the orange, combined substantially as set forth.

25. In an orange wrapping machine, the combination of an orange holding device mounted on a rotatable sleeve, a cam for operating the orange holding device in grasping and releasing the fruit, and sliding keys passing through the rotating sleeve connecting the cam and holding devices, substantially as set forth.

26. The combination in an orange wrapping machine, of an orange receiving and holding device mounted on a rotatable sleeve and a paper collector, a cam for operating the paper collector in opening and closing the same, a ring around the sleeve engaging the collector, and sliding keys in the sleeve connecting the ring with the cam, substantially as set forth.

27. In an orange wrapping machine, the combination of adjustable elastic fingers for receiving and grasping the fruit wrapped in the paper, mounted on an arm to be rotated, and adjustable paper collector and holder mounted on a sleeve to be rotated, mechanism for operating the fingers in grasping and releasing the fruit, and mechanism for operating the paper collector in grasping and releasing the paper, and mechanism for rotating the collector holding arms, substantially as set forth.

28. In an orange wrapping machine, the combination of the traveling paper holding device, the grooved collar in which the paper holding device engages, the movable keys, the stationary cam and means for connecting the cam with the keys for operating the paper holding device, substantially as set forth.

29. In an orange wrapping machine, having traveling arms carrying the wrapping mechanism, of the toothed clutch for driving the arms, a spring for throwing the two parts of the clutch into engagement, the inclined stationary projection and the inclined movable projection on the clutch for engaging with the stationary projection whereby the clutch parts are moved out of engagement by the movable projection riding into the stationary projection and the arms brought momentarily to a rest, combined, substantially as set forth.

30. In an orange wrapping machine, the combination of a two-part toothed clutch, one section of the clutch connected with the driving power and the other with movable arms, the orange wrapping devices carried by the arms, stationary inclined projections, and movable inclined projections on the movable clutch part adapted to engage the stationary projection and moving the clutch parts out of engagement, whereby the arms are halted to receive the fruit, and a spring for throwing the parts into engagement when the projections have passed out of engagement, substantially as set forth.

31. In an orange wrapping machine of the character described, the two-part clutch, one connected with the driving power and the other with the movable arms, the wrapping mechanism carried by the movable arms, the stationary inclined projection or face on the frame and the movable inclined projection or face on the movable part of the clutch for engaging with the stationary projection and moving the parts of the clutch out of engagement, whereby the arms are halted to receive the fruit, and mechanism for throwing the clutch parts again into engagement, substantially as described.

32. In an orange wrapping machine, the combination of an inclined chute for feeding the oranges, having a movable section or portion, a clutch through which the driving power is transmitted to the machine, a spring for disengaging the clutch, a tripping mechanism and the connection between the movable section of the feeding chute and clutch tripping mechanism whereby it is held out of operation when the chute is full, substantially as and for the purposes set forth.

33. In an orange wrapping machine, the combination of an inclined chute for feeding the oranges, having a movable portion or section over which the oranges pass, means for moving the section, a clutch for transmitting the driving power to the machine, a spring and tripping mechanism for disengaging the clutch and a connection between the tripping mechanism and movable portion, of the inclined chute whereby the tripping mechanism is held in check having the clutch engaged when the movable section thereof contains one or more oranges, substantially as set forth.

34. In an orange wrapping machine, the combination of the two sections of clutching device, one mounted on the driving shaft and the other connected to the driving power, the spring for throwing the clutch section out of engagement, the catch for securing the clutch in engagement, an inclined chute having a movable portion, a connection with a clutch tripper, the tripper for the clutch section whereby the clutch will be thrown out of engagement when the chute contains no oranges, substantially as set forth.

35. In an orange wrapping machine, the combination of a paper cutting device, a two-part clutch for connecting the driving power to the mechanism of the machine, a spring for throwing the clutches out of engagement, a catch for securing the clutches in engagement, a catch tripper and a connection between the paper cutting device and the catch tripper whereby the clutch is thrown out of engagement when the paper cutting device fails to operate, substantially as set forth.

36. In a wrapping and twisting machine, an opening, closing and rotating collector, in combination with an opening closing and releasing holder.

37. In a wrapping and twisting machine, an opening, closing and rotating collector, in combination with an opening, closing and oppositely rotating holder.

38. In a wrapping and twisting machine, a table having a feed opening, in combination with an opening, closing and rotating collector, and an opening, closing and releasing holder.

39. In a wrapping and twisting machine, a table having a feed opening, in combination with an opening, closing and rotating collector and an opening, closing and oppositely rotating holder.

40. In a wrapping and twisting machine, a table having a feed opening, in combination with mechanism for feeding wrapping paper over the opening, an opening, closing and rotating collector, and an opening, closing and rotating holder.

41. In a wrapping and twisting machine, a table having a feed opening, mechanism for feeding the wrapping paper over the opening, an opening, closing and rotating holder, a trap for dropping the article to be wrapped onto the paper over the feed opening and into the holder, and a rotating collector for collecting and holding the edges of the paper over the article, substantially as set forth.

42. In a wrapping and twisting machine, a table having a feed opening, in combination with mechanism for feeding wrapping paper over the opening, a cutting device for severing the paper, an opening, and closing paper collector beneath the feed opening, a trap for dropping the article to be wrapped onto the paper over the opening and into the open collector, substantially as set forth.

43. In a wrapping and twisting machine, a table having a feed opening, in combination with mechanism for feeding the wrapping paper over the opening, an opening and closing holder beneath the feed opening, and an opening, closing and rotating paper collector, substantially as set forth.

44. A machine for wrapping fruit and the like, having a feed opening, a carrier arranged to move the wrapping paper vertically over the feed opening, a paper clamp arranged below such opening and a holder and carrier below such clamp, whereby to rotate the article, substantially as set forth.

45. In a wrapping machine, the combination of holders rotating in one direction for holding the article to be wrapped, a set of swinging jaws revolving in the other direction and constructed to grasp and twist the projecting end of the wrapping paper down upon the article to be wrapped.

46. In an orange wrapping machine, the rotary twister engaging the edges of the paper and twisting them together, in combination with the clamps to seize the orange and hold it from rotation.

47. In a wrapping and twisting machine, a contracting and expanding wrapper folder, holder and twister in combination with a contracting and expanding holder for holding and releasing the article wrapped.

48. In a wrapping and twisting machine, an automatically contracting and expanding folder, holder and twister in combination with an automatically contracting and expanding holder for holding and releasing the article wrapped.

49. In a wrapping and twisting machine, a holder and a rotary wrapper twister, combined, substantially as set forth.

50. In a wrapping and twisting machine, a rotary holding and an oppositely moving rotary wrapper twister, combined, substantially as set forth.

51. In a wrapping machine, a table having a feed opening, wrapper feeding mechanism feeding wrappers over the opening, feeding mechanism on one side of the opening, wrapper collecting and holding mechanism on the other side of the opening and rotatable holding and twisting fingers, adapted to grasp the fruit inclosed in the wrapper.

HUMPHREY J. WILLIAMS.

Witnesses:
CHARLES H. BAKER,
D. W. EDELIN.